United States Patent
Walke et al.

(10) Patent No.: US 7,016,676 B2
(45) Date of Patent: Mar. 21, 2006

(54) METHOD, NETWORK AND CONTROL STATION FOR THE TWO-WAY ALTERNATE CONTROL OF RADIO SYSTEMS OF DIFFERENT STANDARDS IN THE SAME FREQUENCY BAND

(75) Inventors: Bernhard Walke, Wuerselen (DE); Stefan Mangold, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 411 days.

(21) Appl. No.: 10/089,959

(22) PCT Filed: Aug. 8, 2001

(86) PCT No.: PCT/EP01/09258

§ 371 (c)(1),
(2), (4) Date: Apr. 4, 2002

(87) PCT Pub. No.: WO02/13457

PCT Pub. Date: Feb. 14, 2002

(65) Prior Publication Data

US 2002/0168979 A1    Nov. 14, 2002

(51) Int. Cl.
*H04Q 7/20*        (2006.01)

(52) U.S. Cl. ............. 455/434; 455/553.1; 455/434.2; 370/466; 370/467

(58) Field of Classification Search ............. 455/434, 455/435.2, 438, 414.4, 432.2, 207, 553.1, 455/22, 314; 370/464–469, 395.5, 395.52, 370/395.53
See application file for complete search history.

(56) References Cited

U.S. PATENT DOCUMENTS

| | | | |
|---|---|---|---|
| 5,239,662 A * | 8/1993 | Danielson et al. | 709/246 |
| 5,710,766 A | 1/1998 | Schwendeman | 370/329 |
| 6,052,594 A * | 4/2000 | Chuang et al. | 455/450 |
| 6,310,866 B1 * | 10/2001 | Kronestedt et al. | 370/330 |
| 6,377,782 B1 * | 4/2002 | Bishop et al. | 455/3.01 |
| 6,501,741 B1 * | 12/2002 | Mikkonen et al. | 370/310 |
| 6,580,700 B1 * | 6/2003 | Pinard et al. | 370/332 |
| 6,587,680 B1 * | 7/2003 | Ala-Laurila et al. | 455/411 |
| 6,631,259 B1 * | 10/2003 | Pecen et al. | 455/426.1 |
| 6,687,243 B1 * | 2/2004 | Sayers et al. | 370/356 |
| 6,728,244 B1 * | 4/2004 | Takabatake | 370/392 |
| 6,735,452 B1 * | 5/2004 | Foster et al. | 455/562.1 |
| 6,754,200 B1 * | 6/2004 | Nishimura et al. | 370/349 |
| 6,792,286 B1 * | 9/2004 | Bharath et al. | 455/554.2 |

FOREIGN PATENT DOCUMENTS

| | | |
|---|---|---|
| EP | 1119137 A1 | 1/2000 |
| WO | WO9923790 | 10/1998 |

* cited by examiner

*Primary Examiner*—CongVan Tran

(57) ABSTRACT

The invention relates to an interface-control protocol method for a radio system, which has at least one frequency band provided for the two-way alternate utilization of a first and a second radio interface standard. The radio system comprises a number of stations, which each function in accordance with a first radio interface standard and/or in accordance with a second radio interface standard, in which a control station is provided that controls the two-way alternate utilization of the frequency band.

9 Claims, 3 Drawing Sheets

METHOD, NETWORK AND CONTROL STATION FOR THE TWO-WAY ALTERNATE CONTROL OF RADIO SYSTEMS OF DIFFERENT STANDARDS IN THE SAME FREQUENCY BAND

The invention relates to a method of alternate control of radio systems of different standards in the same frequency band.

A radio system for wireless transmission of information is allowed to use transmission power only in accordance with standards. The national regulation authority determines on what frequencies with what transmission power and in accordance with what radio interface standard a radio system is allowed to transmit. For this purpose there is provided for so-termed ISM frequency bands (Industrial Scientific Medical) that radio systems transmit in the same frequency band in accordance with different radio interface standards. An example of this is the US radio system IEEE802.11a and the European ETSI BRAN HiperLAN/2. The two radio systems transmit in the same frequency bands between 5.5 GHz and 5.875 GHz with approximately the same radio transmission method, but different transmission protocols.

In the event of interference, method were standardized for an active switching to another frequency within the permitted frequency band, for controlling transmission power and for the adaptive coding and modulation to reduce interference. Radio systems of wideband LANs of the radio interface standards ETSI BRAN HiperLAN/2 and IEEE802.11a utilize the same radio transmission method, a 64-carrier OFDM method and an adaptive modulation and coding. About the same modulation and coding methods (Link Adaptation, LA) are defined for the two standards.

The Medium Access Control (MAC) of the two systems is totally different. ETSI BRAN HiperLAN/2 utilizes a centrally controlled reservation-based method in which a radio station takes over the role of a central instance co-ordinating the radio resources. This central radio station (Access Point, AP) which may be an access point to the wide area network, periodically signals every 2 ms the MAC frame structure from the AP and the associated stations if required.

The IEEE802.11a standard describes a CSMA/CA (Carrier Sense Multiple Access/Collision Avoidance) method not based on reservations, in which all the radio stations listen in on the medium and assume that the channel is unused for a minimum duration (Short InterFrame Space, SIFS) before 802.11a-MAC frames, thus user data packets, are transmitted if necessary. The method is highly suitable for self-organizing ad hoc networks, but requires positive acknowledgements of all the packets. Measures supporting service quality (Point Coordination Function PCF) in addition allow the support of multimedia applications. FIG. 2 shows by way of example the sequence for media access in accordance with IEEE802.11a. In accordance with a variant of the standard a station is to then transmit an RTS packet (Ready To Send) and wait for a CTS packet (Clear To Send) from the addressed station before it is allowed to transmit user data. All the other stations in the radio coverage area set a time monitoring (Network Allocation Vector, NAV) and do not transmit until the addressed station has sent an acknowledgement (ACKnowledge, ACK).

Wideband LANs in accordance with the HiperLAN/2 and 802.11a standards will operate in the same frequency band in the future between 5.15 and 5.825 GHz. The wideband LANs work with Transmitter Power Control (TPC), it is true, with adaptive radio transmission methods and the Dynamic Frequency Selection (DFS) to minimize the alternating interfering effects, these methods, however, do not make optimum use and spreading possible of the radio channels over the stations which transmit in accordance with different standards. The guarantee of the service quality necessary for the multimedia applications is impossible in the case of interference caused by their own stations or stations of outside systems. In case of alternating interference, systems do not work efficiently and occupy a frequency channel even at low transmission rates.

It is an object of the invention to provide a method, a wireless network and a control station which make efficient use of radio transmission channels possible.

This object is achieved for the method in accordance with the invention by an interface control protocol method for a radio system, which system comprises at least a frequency band provided for the alternate use of a first and a second radio interface standard, the radio system comprising stations which operate in accordance with a first radio interface standard and/or a second radio interface standard, respectively, a control station being provided which controls the alternate use of the frequency band.

The invention is based on the idea of providing a comprehensive standard exchange of implicit or explicit control information in systems that have the same radio transmission methods but different radio transmission protocols. This makes a simple and efficient use possible of a radio channel via a plurality of radio interface standards.

The radio system comprises one or more stations. The stations may be, for example, computers of a wireless local area network. These stations may be arranged, for example, only for operation in accordance with a first or second radio interface standard. But it is also possible for stations to operate in accordance with both the first and the second radio interface standard.

A first number of stations preferably forms a wireless local area network in accordance with a first radio interface standard and a second number of stations forms a wireless network in accordance with a second radio interface standard. The first radio interface standard may be, for example, the HiperLAN/2 standard and the second radio interface standard may be the IEEE802.11a standard.

For these two standards is reserved the frequency band from 5.15 GHz to 5.825 GHz.

In accordance with the invention a control station is provided which controls the alternate use of the common frequency band of the two radio interface standards.

The control station is preferably a station that may operate in accordance with both the first and the second radio interface standard.

The control of the alternate use of the common frequency band may be effected in various ways. For example, it is possible to provide certain predefinable time intervals for the use of the first and second radio interface standard and allocate the frequency band alternately to the first radio interface standard and then to the second radio interface standard in a kind of time-division multiplex mode.

However, it is advantageous to effect the allocation by means of adaptive protocols. The common radio channel can then be utilized more effectively particularly when the demand for transmission capacity in accordance with the first and the second radio interface standard varies.

In the advantageous embodiment of the invention as claimed in claim 2, the control station is provided, on the one hand, for controlling the access to the frequency band for stations operating in accordance with the first radio interface standard. If the first radio interface standard is, for example, the HiperLAN/2 standard, the control station performs the function of the central controller (Access Point AP) in accordance with this standard. In that case the stations of the HiperLAN/2 standard send a request for capacity to the control station and the control station allocates transmission capacity to each respective station.

On the other hand, the control station is provided in an advantageous embodiment of the invention as claimed in claim 2 for releasing the common frequency band for access by stations operating in accordance with the second radio interface standard, if stations operating in accordance with the first radio interface standard do not request access to the frequency band. In this advantageous embodiment of the invention the first radio interface standard is given priority over the second radio interface standard in this manner. The release of the common frequency band for the second radio interface standard may be effected, for example, explicitly by the sending of control information to the stations of the second radio interface standard.

Alternatively, it is possible, for example, that the point coordinator provided in accordance with the IEEE802.11a standard operates as the central control station and controls the alternate access of stations of the first and second radio interface standard to the common frequency band. In this advantageous embodiment of the invention the point coordinator could for example periodically render the common frequency band available to another radio interface standard, for example, to the HiperLAN/2 standard.

In the advantageous embodiment as claimed in claim 3, the control is effected in that the control station determines the respective duration in which the stations operating in accordance with the second radio interface standard can utilize the common frequency band. Determining the duration may advantageously be effected as claimed in claim 4 in that the control station sends a broadcast signal which informs the stations of a time period in which the frequency band can be used by stations operating in accordance with the second radio interface standard.

It is an advantage of the invention that when radio systems are operated in phases in which no information is sent or received by a radio station in accordance with a first radio interface standard, the additional sending of information in accordance with another radio interface standard becomes possible, so that the access to the radio channel can be controlled by competing radio systems.

It is then possible for a first radio station operating in accordance with a first radio interface standard to additionally carry out certain functions described in a second radio interface standard, while the first radio station or a coordinating further radio station that transmits in accordance with the first radio interface standard determines the beginning and duration of the phase that may be used by the first station for transmission in accordance with the second radio interface standard.

Depending on the radio interface standard, beginning and duration can be defined only approximately, while the respective standards are violated regularly or from time to time. The first station may preferably end the phase during which it transmits in accordance with the second radio interface standard, while disregarding resulting interference in stations operating in accordance with the second radio interface standard.

The first radio station may, in addition to functions in accordance with the second radio interface standard, also carry out functions that cause radio systems working in accordance with the second radio interface standard or radio systems working in accordance with the first radio interface standard to interpret the radio channel as interfered and occupy another radio channel for its own operation.

The efficient common use of a radio channel by different radio systems may be achieved via a suitable control protocol method. Such a radio interface control protocol method enables a first station of a radio system working in accordance with the first radio interface standard to control the access times to the radio channel by other stations. For this purpose this first station then has to carry out functions described in another, second radio interface standard in addition to the functions laid down by its own first radio interface standard at times at which stations working in accordance with the first radio interface standard do not send and do not expect information in accordance with the standard from the first station, while the first station or a further station determines the duration for which the first station is allowed to transmit in accordance with the second radio interface standard. The duration of the operation in accordance with the second radio interface standard need not be determined exactly but may also be determined approximately. A transmission in accordance with the first radio interface standard can provide that the first station terminates the use of the radio interface in accordance with the second radio interface standard without taking resulting interference into account in stations that send in accordance with the second radio interface standard.

The object of the invention is achieved for the network by a wireless network that has at least one frequency band that is provided for the alternate use by a first and a second radio interface standard, while the wireless network comprises stations that work in accordance with the first and/or the second radio interface standard, a control station being provided which controls the alternate use of the frequency band.

Several examples of embodiment of the invention will be further explained below with reference to the drawing in the FIGS. 1 to 3, in which:

FIG. 1 shows the structure of the HiperLAN/2-MAC frame.

Figure 2:
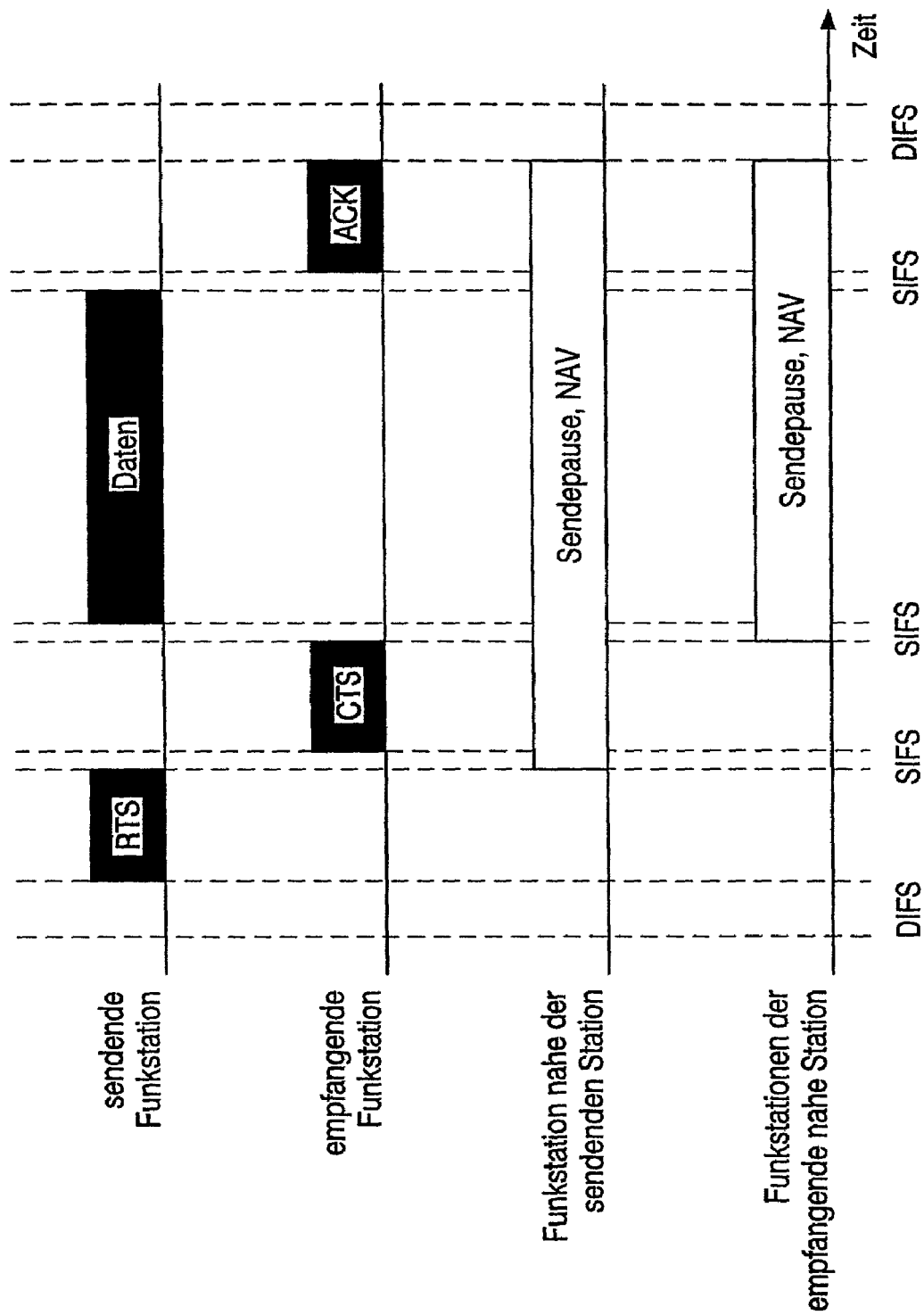

FIG. 2 diagrammatically shows the media access in systems working in accordance with the radio interface standard IEEE802.11a.

In a HiperLAN/2 system the central controller can be controlled via the Access Point (AP) which periodically generates the MAC frame and then transmits the data of the broadcast phase to individually control the service quality (packet delay sending rate and so on) of individual links.

Figure 1:
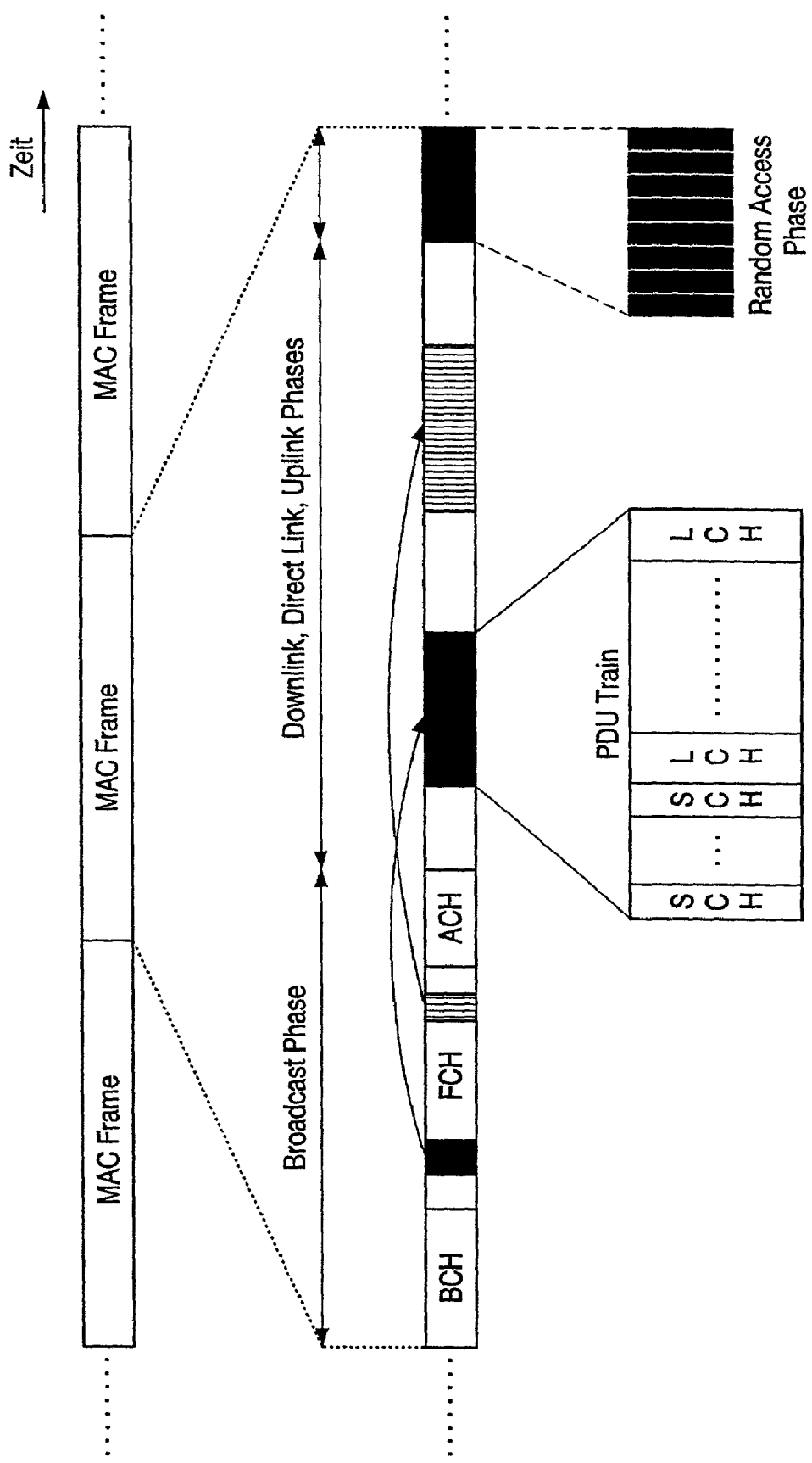
FIG. 1 shows the frame structure in accordance with the ETSI BRAN HiperLAN/2 standard, FIG. 2 gives a diagrammatic representation of the access to a radio channel in systems in accordance with the IEEE802.11a standard.

Transmission in FIGS. 1 and 2 with respect to the associated standards is understood to mean that a HiperLAN/2 AP in a partially unused downlink, uplink and direct-mode phase could dispense with sending useless (dummy) information and giving 802.11-systems no opportunity to observe an unused channel for a period of time SIFS and starting the run as shown in FIG. 2. The AP could readily regain the control in which the transmission in accordance with the HiperLan/2 standard does not suppress the broadcast phase, but transmission takes place. Likewise, the function PCF of the 802.11 standard could be used to occasionally render the radio channel available to HiperLAN/2 systems with a time limit (periodically).

The alternate control of radio systems of different standards, which control is proposed here and discussed with respect to an example of the wideband LANs ETSI BRAN HiperLAN/2 and IEEE802.11a, may guarantee in a heterogeneous environment in which various radio systems simultaneously transmit very close together in the same spectrum, a decentrally controlled adaptivity relative to the transmission capacity available in the respective systems for the management of the respective current traffic supply, of the required service quality and of the environment of use. When the integrated controller in accordance with the invention is used, different radio systems may be made compatible in the way that they constructively coexist in the same frequency band and then can provide services that require a high service quality. The radio spectrum is clearly used more efficiently; without the implementation of the new method this is only possible with respective exclusively used radio channels.

Figure 3:
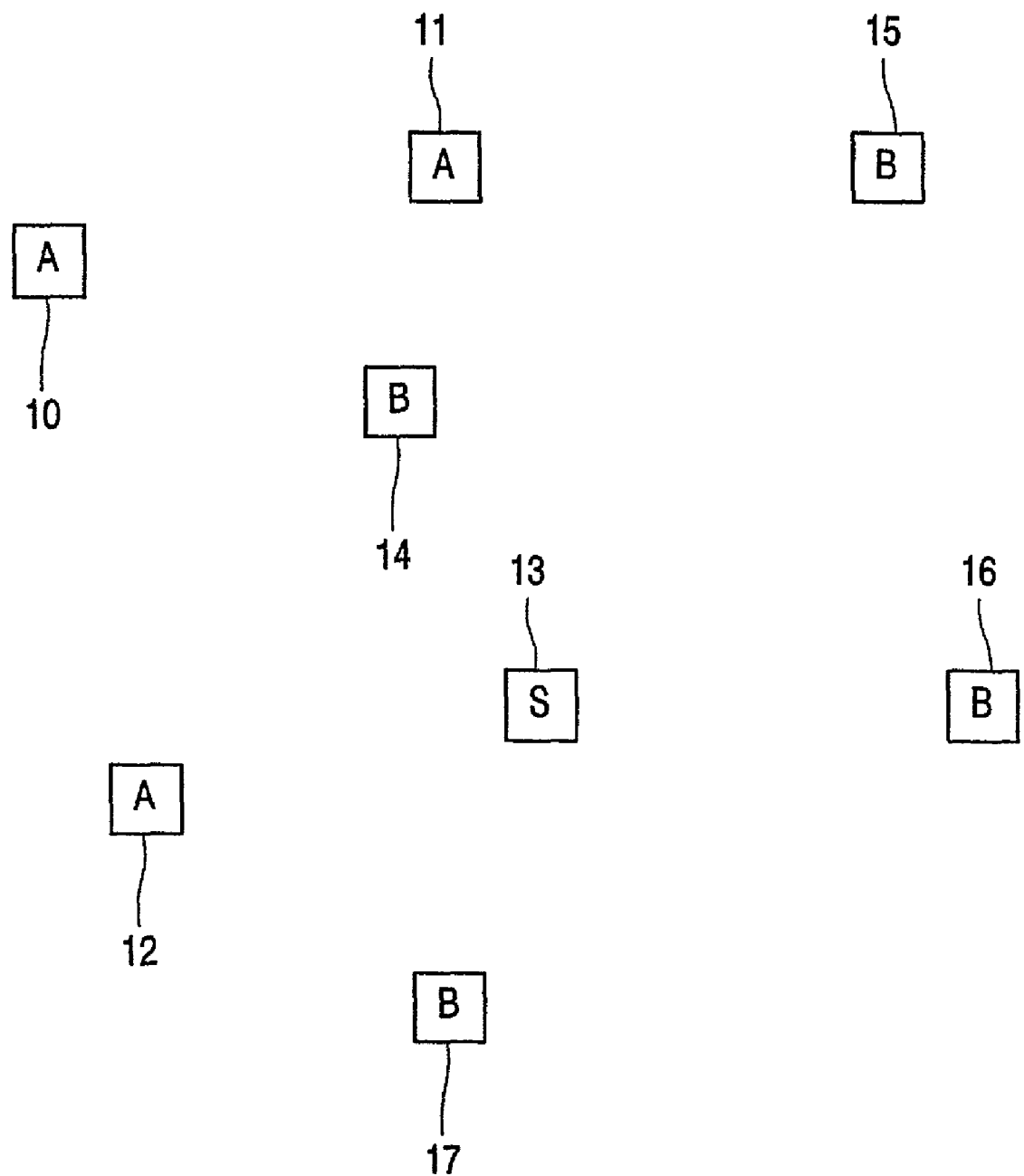
FIG. 3 shows two wireless local area networks in accordance with a first and a second radio interface standard.

FIG. 3 diagrammatically shows two wireless local area networks.

A first wireless local area network comprises three stations 10, 11 and 12. These three stations 10, 11 and 12 work in accordance with the first radio interface standard A, for example, in accordance with the HiperLAN/2 standard.

A second wireless local area network includes four stations 14, 15, 16 and 17. These four stations 14, 15, 16 and 17 work in accordance with the second radio interface standard B, for example, in accordance with the IEEE802.11a standard.

The stations may be, for example, computers which include a radio interface. The communication between the individual stations is effected in a wireless fashion, for example, by radio.

For wireless local area networks in accordance with the HiperLAN/2 and IEEE802.11a standards the frequency band is comprised between 5.15 GHz and 5.825 GHz.

A central control station 13 is provided which controls the alternate access by the first wireless network and the second wireless network to the common frequency band.

This may be effected in an advantageous manner in that the station 13 sends a broadcast message to the stations 14 to 17 of the IEEE802.11a standard when the stations 10 to 12 do not need transmission capacity. This broadcast message preferably contains time information which informs the stations 14 to 17 of the IEEE802.11 standard how long they are allowed to utilize the common frequency band. During this time the control station 13 can also carry out functions in accordance with the IEEE802.11a standard, for example, also be used for data transmission in accordance with the IEEE802.11a standard.

If the stations 10 to 12 of the first wireless network are HiperLAN/2 stations, the control station 13 preferably also operates as the central control station (Access Point) of the HiperLAN/2 network and co-ordinates its radio resources. In HiperLAN/2 systems it is planned beforehand at what time the stations are allowed to send. For this purpose the HiperLAN/2 systems have a central controller (Access Point, AP) which receives the requests for capacity from the various stations and assigns capacity accordingly. The central control station 13 is preferably also provided for carrying out the function of the access point of the HiperLAN/2 standard. The central control station 13 then periodically signals every 2 ms the MAC frame structure in accordance with the requirements of the individual stations of the HiperLAN/2 network.

Alternatively, it is also possible, however, in HiperLAN/2 systems for the function of the access point and the function of the alternating control of the access to the common frequency band by the first wireless network and the second wireless network to be realized in separate stations. In that case, however, with respect to the duration in which the frequency band can be utilized by the first or second radio interface standard a data exchange is necessary between these separate stations.

Alternatively, it is possible, for example, for the point co-ordinator provided in accordance with the IEEE802.11 standard to operate as a central control station and to control the alternate access to the common frequency band by stations of the first and second radio interface standards. In this embodiment the point co-ordinator would, for example, periodically render the common frequency band available to another radio interface standard, for example, to the HiperLAN/2 standard.

What is claimed is:

1. An interface-control protocol method for a radio system which has at least one common frequency band that is provided for alternate use by a first and a second radio interface standard, the radio system comprising:
   stations which operate in accordance with a first radio interface standard and/or a second radio interface standard, and
   a control station which controls the alternate use of the frequency band,
   wherein the control station controls the access to the common frequency band for stations working in accordance with the first radio interface standard and— renders the frequency band available for access by the stations working in accordance with the second radio interface standard if stations working in accordance with the first radio interface standard do not request access to the frequency band.

2. The method as claimed in claim 1, herein the control station determines the respective duration in which the stations working in accordance with the second radio interface standard are allowed to utilize the frequency band.

3. The method as claimed in claim 1, wherein the control station sends a broadcast signal informing the stations of a time duration in which the common frequency band can be used by stations working in accordance with the second radio interface standard.

4. The method as claimed in claim 2, wherein the duration of operation in accordance with the first and second radio interface standards is laid down only approximately while the respective standards are violated regularly or from time to time.

5. The method as claimed in claim 1, wherein the control station also carries out functions which cause radio systems in accordance with the first radio interface standard to interpret the radio channel as interfered and to seize another radio channel for its own operation.

6. An interface-control protocol method for a radio system which has at least one common frequency band that is provided for alternate use by a first and a second radio interface standard, the radio system comprising:
   stations which operate in accordance with a first radio interface standard and/or a second radio interface standard, and
   a control station which controls the alternate use of the frequency band,
   wherein the control station terminates the use of the radio interface in accordance with the second radio interface standard by transmitting in accordance with the first radio interface standard, without taking account of resulting interference in stations working in accordance with the second radio interface standard.

7. An interface-control protocol method for a radio system which has at least one common frequency band that is provided for alternate use by a first and a second radio interface standard, the radio system comprising:

stations which operate in accordance with a first radio interface standard and/or a second radio interface standard, and a control station which controls the alternate use of the frequency band, wherein the control station controls the access to the common frequency band by stations working in accordance with the first radio interface standard and in that duration and type of control of the radio interface in accordance with the second radio interface standard is determined by a further station and transmitted to the control station.

8. An interface-control protocol method for a radio system which has at least one common frequency band that is provided for alternate use by a first and a second radio interface standard, the radio system comprising:

stations which operate in accordance with a first radio interface standard and/or a second radio interface standard, and a control station which controls the alternate use of the frequency band, wherein the control station, in addition to functions in accordance with the second radio interface standard, also carries out functions which cause radio systems in accordance with the second radio interface standard to interpret the radio channel as interfered and to seize another radio channel for its own operation.

9. A wireless network comprising at least one common frequency band provided for alternate use by a first and a second radio interface standard, the wireless network comprising:

stations which work in accordance with a first radio interface standard and/or in accordance with a second radio interface standard, and a control station which controls the alternate use of the common frequency band, wherein the control station controls the access to the common frequency band for stations working in accordance with the first radio interface standard and— renders the frequency band available for access by the stations working in accordance with the second radio interface standard if stations working in accordance with the first radio interface standard do not request access to the frequency band.

* * * * *